United States Patent
Bernosky

(10) Patent No.: US 11,022,246 B1
(45) Date of Patent: Jun. 1, 2021

(54) WASTE SYSTEM SECURING STRAP ASSEMBLY

(71) Applicant: Bradley L. Bernosky, West Chester, PA (US)

(72) Inventor: Bradley L. Bernosky, West Chester, PA (US)

(*) Notice: Subject to any disclaimer, the term of this patent is extended or adjusted under 35 U.S.C. 154(b) by 0 days.

(21) Appl. No.: 17/160,756

(22) Filed: Jan. 28, 2021

Related U.S. Application Data

(60) Provisional application No. 63/033,234, filed on Jun. 2, 2020.

(51) Int. Cl.
*F16L 43/02* (2006.01)

(52) U.S. Cl.
CPC ........... *F16L 43/02* (2013.01); *Y10T 24/2187* (2015.01)

(58) Field of Classification Search
CPC ...................................................... F16L 43/02
See application file for complete search history.

(56) References Cited

U.S. PATENT DOCUMENTS

| | | | |
|---|---|---|---|
| 4,093,282 A * | 6/1978 | Kyriakodis | F16L 33/08 285/114 |
| 4,158,462 A | 6/1979 | Coral | |
| 4,296,902 A * | 10/1981 | Dachtler | A61J 9/0638 248/102 |
| 5,023,959 A | 6/1991 | Mercer | |
| 5,357,654 A * | 10/1994 | Hsing-Chi | A42B 3/145 2/418 |
| 6,123,366 A | 9/2000 | Kirakopolos et al. | |
| 6,354,937 B1 * | 3/2002 | Crook | F24F 13/0209 138/106 |
| 6,708,376 B1 * | 3/2004 | Landry | A42B 3/145 2/418 |
| 6,837,787 B2 | 1/2005 | Crook | |
| 7,144,046 B1 | 12/2006 | Lape et al. | |
| 8,037,548 B2 * | 10/2011 | Alexander | A42B 3/145 2/418 |
| 8,038,175 B2 | 10/2011 | Crook | |
| 8,646,732 B2 | 2/2014 | Birch | |

(Continued)

FOREIGN PATENT DOCUMENTS

| | | |
|---|---|---|
| JP | 4409046 | 2/2010 |
| KR | 20170001878 | 5/2017 |

OTHER PUBLICATIONS www.rockfordchimneysupply.com/elbow-kits-15 or 30 degree.php. Printed Jan. 24, 2020.

(Continued)

*Primary Examiner* — James M Hewitt, II
(74) *Attorney, Agent, or Firm* — Joseph E. Maenner; Petock & Petock LLC

(57) ABSTRACT

A securing strap assembly includes a horizontal strap configured to wrap around a vertical standpipe. A pivoting strap is pivotally attached to the horizontal strap and is configured to extend over a pipe elbow inserted into the vertical standpipe. The pivoting strap has a first leg having a first connected end pivotally connected to the horizontal strap and a first adjusting end, a second leg having a second connected end pivotally connected to the horizontal strap and a second adjusting end, and a first adjustment mechanism configured to draw the first adjusting end and the second adjusting end to each other.

13 Claims, 6 Drawing Sheets

(56) References Cited

U.S. PATENT DOCUMENTS

| | | |
|---|---|---|
| 9,534,718 B2 | 1/2017 | O'Neil et al. |
| 9,927,047 B2 | 3/2018 | Muniz |
| 10,240,692 B2 | 3/2019 | Won et al. |
| 2004/0262913 A1 | 12/2004 | Anderson et al. |
| 2006/0225187 A1* | 10/2006 | Wu .................. A42B 3/145 |
| | | 2/425 |

OTHER PUBLICATIONS www.homedepot.com/p/sharkbite-PEX-pipe-90-degree-stub-out-bend-support-24603A2/206133169. Printed Jan. 23, 2020.
www.ruralenergy.com/parent-brand/duravent/5dt-es-stove-pipe-dt-elbow-strap-5. Printed Jan. 24, 2020.

\* cited by examiner

US 11,022,246 B1

WASTE SYSTEM SECURING STRAP ASSEMBLY

CROSS-REFERENCE TO RELATED APPLICATION

The present application claims priority from U.S. Provisional Patent Application Ser. No. 63/033,234, filed on Jun. 2, 2020, which is incorporated herein by reference in its entirety.

BACKGROUND OF THE INVENTION

Field of the Invention

The present invention is directed to a securing assembly to releasably maintain a sewage hose connected to a standpipe for a waste disposal containment system.

Description of the Related Art

Prior art pipe clamps are often sized for particular pipe diameters and are not designed to releasably secure a pipe elbow to an open vertical standpipe to allow discharge from the elbow into the standpipe.

It would be beneficial to provide a pipe clamp that is readily adjustable for different diameters of pipe and pipe elbows, as well as to be able to securely retain a pipe elbow onto a vertical open standpipe.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a securing strap assembly that includes a horizontal strap configured to wrap around a vertical standpipe. A pivoting strap is pivotally attached to the horizontal strap and is configured to extend over a pipe elbow inserted into the vertical standpipe. The pivoting strap has a first leg having a first connected end pivotally connected to the horizontal strap and a first adjusting end, a second leg having a second connected end pivotally connected to the horizontal strap and a second adjusting end, and a first adjustment mechanism configured to draw the first adjusting end and the second adjusting end to each other.

In another embodiment, the present invention provides a securing strap assembly having a horizontal strap having a first horizontal strap end, a second horizontal strap end, and an adjustment mechanism configured to move the first horizontal strap end relative to the second horizontal strap end. A pivoting strap is configured to extend over a pipe elbow inserted into the vertical standpipe. The pivoting strap has a first leg having a first connected end pivotally connected to the horizontal strap, a first adjusting end, and a first dogleg extending between the first connected end and the first adjusting end. The pivoting strap also has a second leg having a second connected end pivotally connected to the horizontal strap, a second adjusting end, and a second dogleg extending between the second connected end and the second adjusting end. A first adjustment mechanism is configured to draw the first adjusting end and the second adjusting end to each other.

In another embodiment, the present invention provides a method of securing a pipe elbow to a standpipe. The method comprises the steps of sliding the horizontal strap of claim 10 over the standpipe; inserting the pipe elbow into the standpipe; lifting the pivoting strap up and pivoted over the elbow; tightening the first adjustment to secure the horizontal strap around the standpipe; and tightening the second adjustment mechanism to force the elbow downward into the standpipe.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
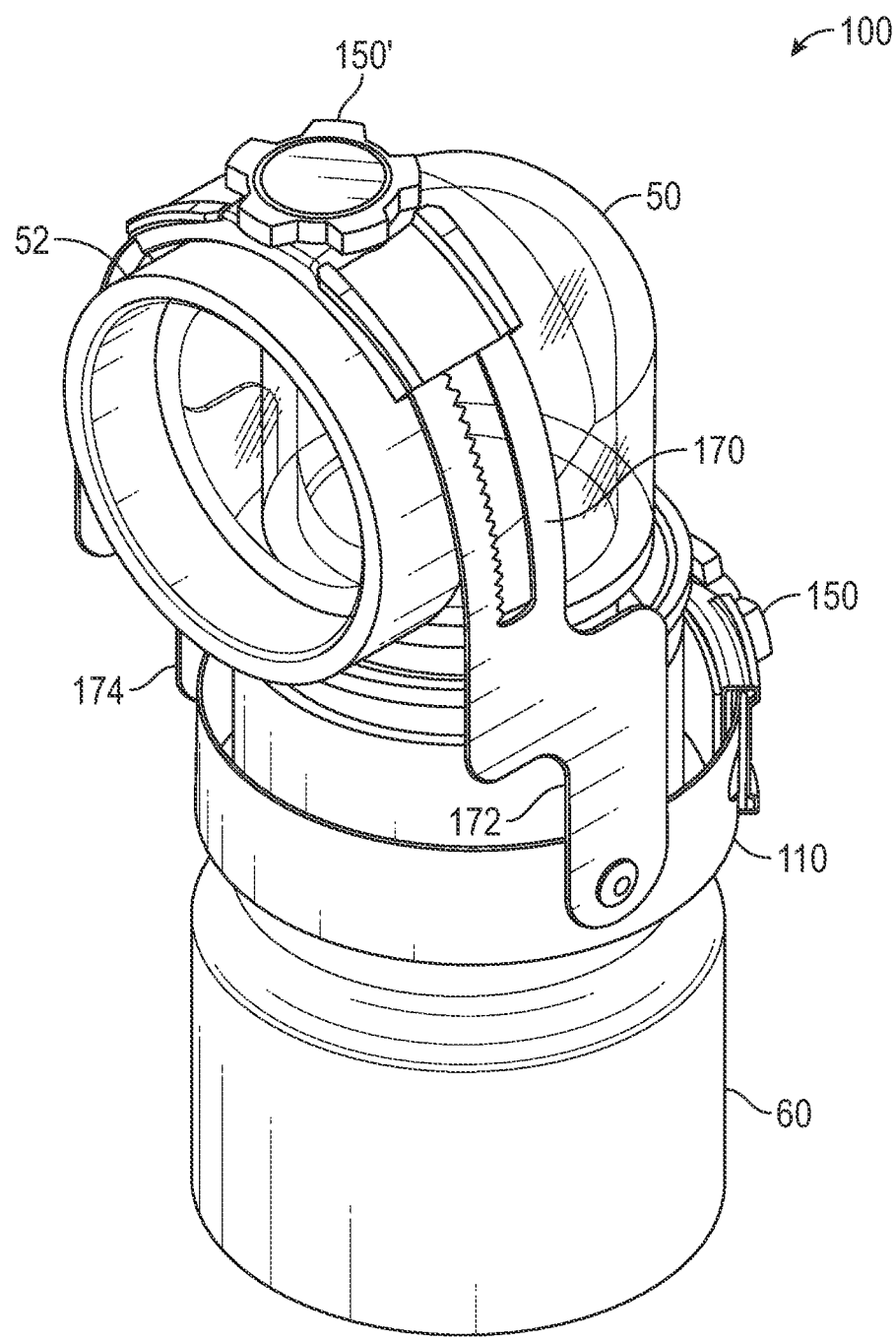
FIG. 1 is a perspective view of a waste system securing strap assembly according to an exemplary embodiment of the present invention securing a waste elbow to a standpipe.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a securing strap for securing the waste hose from an RV or other vehicle to a standpipe for a waste disposal containment system. The standpipe can be oriented in any direction; as described herein, however, the standpipe extends vertically. In an exemplary use, referring to FIG. 1, a waste hose from an RV ends at a connection 52 in an elbow 50 that is inserted into the vertical standpipe 60 of an underground waste containment system, so that effluent from the RV can be pumped from the RV to the permanent waste disposal containment system. The inventive strap assembly 100 is used to secure elbow 50 to standpipe 60 so that elbow 50 is not inadvertently jarred loose from standpipe 60, which can result in effluent being dumped on the ground, possibly causing contamination issues.

Strap assembly 100 includes a horizontal strap 110 that wraps around vertical standpipe 60, with a pivoting strap 170 that is attached to horizontal strap 110 at pivot pins 111 and extends over elbow 50. Pivoting strap 170 can be tightened to force elbow 50 downward into vertical standpipe 60 to prevent elbow 50 from popping out of vertical standpipe 60 while effluent is being pumped through elbow 50 to standpipe 60.

Figure 2:
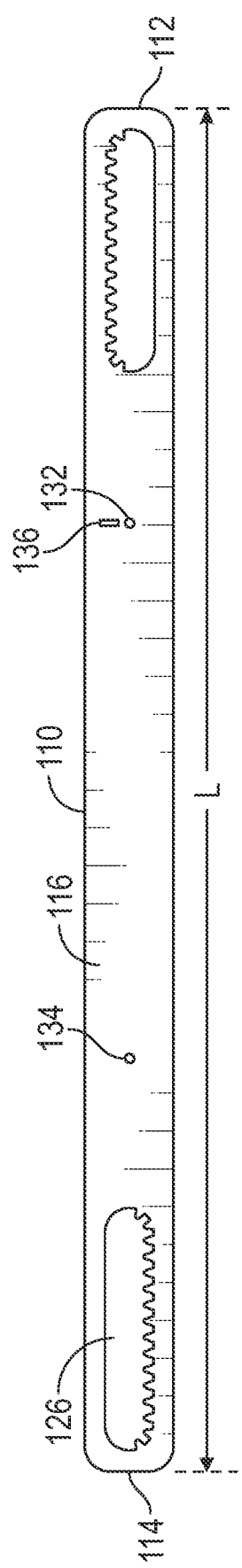
FIG. 2 is a front elevational view of a horizontal strap used with the strap assembly of FIG. 1.
Figure 3:
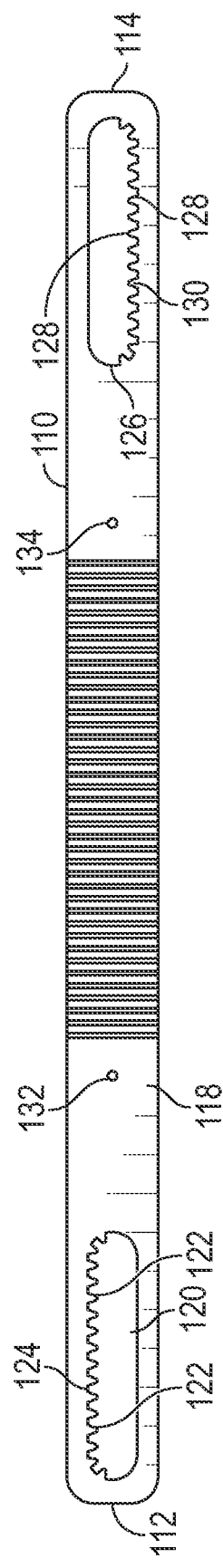
FIG. 3 is a rear elevational view of the strap of FIG. 2.

Referring to FIGS. 2 and 3, horizontal strap 110 is an elongate strap having a length "L" with a first end 112 and an opposing second end 114. Strap 110 also include a front face 116 and a rear face 118.

A first partially toothed cutout 120 is formed proximate to first end 112. Cutout 120 is generally oblong in shape with a plurality of inwardly extending teeth 122 formed along the top 124 of cutout 120. Similarly, a second partially toothed cutout 126 is formed proximate to second end 114. Cutout 126 is generally oblong in shape with a plurality of inwardly extending teeth 128 formed along the bottom 130 of cutout 120. It is noted that teeth 122, 128 are located on opposing sides of their respective cutouts 120, 126.

Approximately ⅓ the length L of strap 110 from first end 112 is a first through-opening 132 and approximately ⅓ the length L of strap 110 from second end 114 is a second through-opening 134. Through-openings 132, 134 are attachment points for pivoting strap 170. Optionally, indicia 136 can be provided proximate to one of through-openings 132, 134 as an assembly guide for a portion of pivoting strap 170 to ensure proper assembly of pivoting strap 170 with horizontal strap 110.

Referring to rear face 118, optionally, a central portion 140 of strap 110 includes a textured surface, such as a plurality of vertical ribs 142, that are used to enhance friction between strap 110 and standpipe 60.

Figure 4:
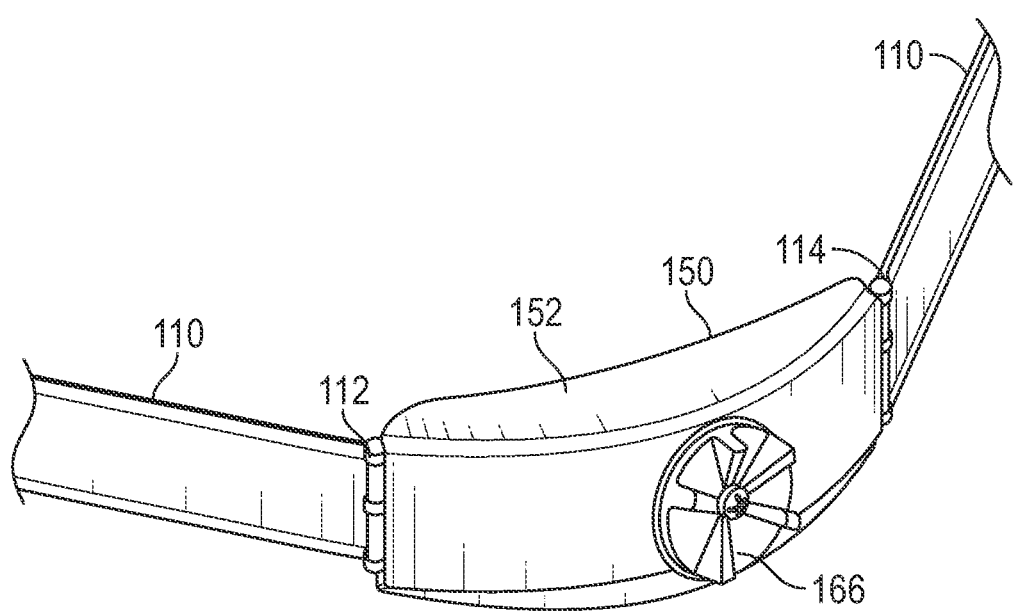
FIG. 4 is a perspective view of an exemplary ratchet mechanism used with the strap assembly if FIG. 1.
Figure 5:
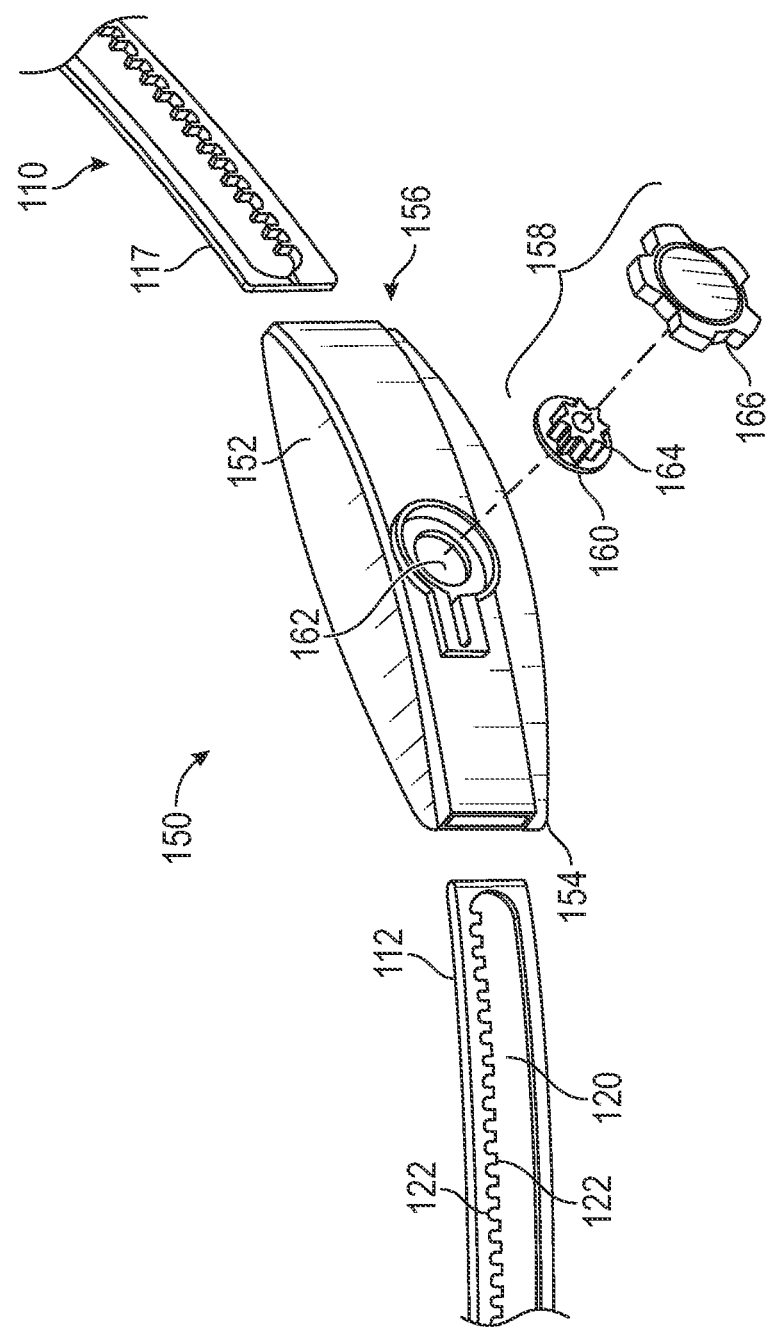
FIG. 5 is an exploded perspective view of the ratchet mechanism of FIG. 4.

Referring to FIGS. 4 and 5, an exemplary ratchet mechanism 150 is used to connect first end 112 with second end 114 and tighten first end 112 with respect to second end 114 to tighten horizontal strap 110 around standpipe 60. Ratchet mechanism 150 is well known in the art and includes a body 152 with a first slot 154 for first end 112 and a co-linear second slot 156 for second end 114.

First end 112 and second end 114 are advanced into their respective slots 154, 156 until cutouts 120, 126 overlap. A ratchet wheel 158 has a toothed portion 160 that is inserted into a recess 162 in body 152 behind both first end 112 and second end 114 such that teeth 164 in toothed portion 160 engage teeth 122, 128 of cutouts 120, 126, respectively. A rotating knob 166 extends from in front of first end 112 and second end 114, through both cutouts 120, 126, to engage toothed portion 160 such that, as knob 166 rotates, toothed portion 160 rotates and moves first end 112 and second end 114 in opposite directions, either tightening or loosening strap 110 around standpipe 60, depending on the direction of rotation of knob 166. While exemplary ratchet mechanism 150 is shown and described, those skilled in the art will recognize that other types of strap tightening mechanisms can be used in lieu of ratchet mechanism 150.

Figure 6:
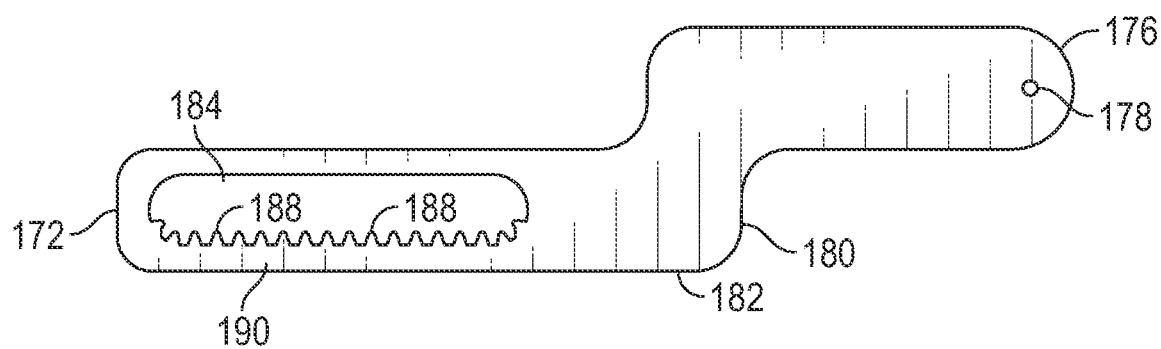
FIG. 6 is a front elevational view of a first pivoting strap used with the strap assembly of FIG. 1.
Figure 7:
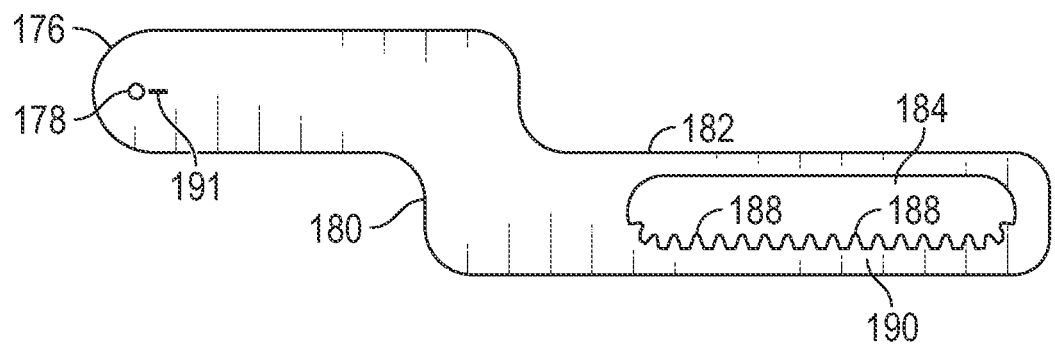
FIG. 7 is a rear elevational view of the first pivoting strap of FIG. 6.
Figure 8:
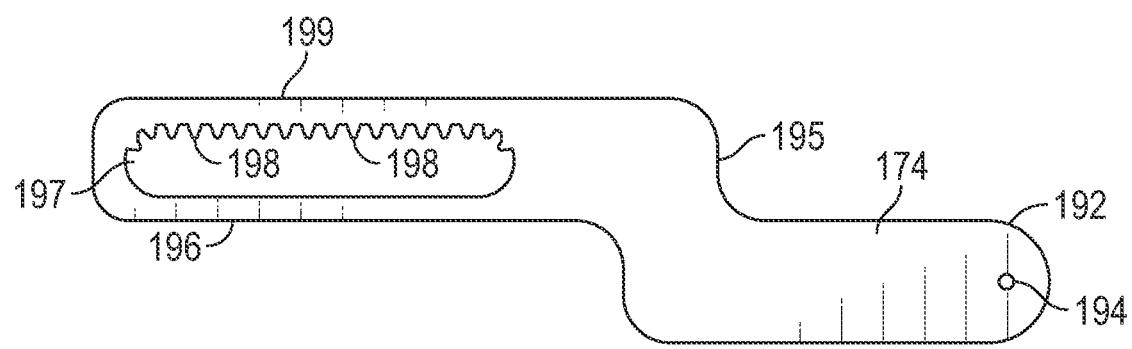
FIG. 8 is a front elevational view of a second pivoting strap used with the strap assembly of FIG. 1.

Pivoting strap 170 includes a first, or right, strap portion 172, shown in FIGS. 6 and 7, and a second, or left, strap portion 174, shown in FIG. 8. Right strap portion 172 includes a pivot end 176 having a through opening 178 extending therethrough. Through opening 178 is aligned with through opening 134 on strap 110 so that right strap portion 172 is pivotally connected to strap 110 with a pivot pin 111.

A dogleg 180 extends from pivot end 176 and terminates at a ratcheting end 182. Dogleg 180 serves to move the upper part of pivoting strap 170 off the central axis of standpipe 60 and toward the connection joint 52 of elbow 50 to provide better leverage to force elbow 50 downward onto standpipe 60.

Ratcheting end 182 includes a first partially toothed cutout 184 formed therein. Cutout 184 is generally oblong in shape with a plurality of inwardly extending teeth 188 formed along the bottom 190 of cutout 184.

As shown in FIG. 7, optionally, indicia 191 can be provided proximate to through opening 178 to align with indicia 136 in strap 110 to ensure that right strap portion 172 is attached to strap 110 at through opening 132.

Referring to FIG. 8, left strap portion 174 includes a pivot end 192 having a through opening 194 extending therethrough. Through opening 194 is aligned with through opening 132 on strap 110 so that left strap portion 174 is pivotally connected to strap 110 with a pivot pin 111.

A dogleg 195 extends from pivot end 194 and terminates at a ratcheting end 196. Similar to dogleg 180, dogleg 195 serves to move the upper part of pivoting strap 170 off the central axis of standpipe 60 and toward the connection joint 52 of elbow 50 to provide better leverage to force elbow 50 downward onto standpipe 60.

Ratcheting end 196 includes a first partially toothed cutout 197 formed therein. Cutout 197 is generally oblong in shape with a plurality of inwardly extending teeth 198 formed along the top 199 of cutout 197.

Figure 9:
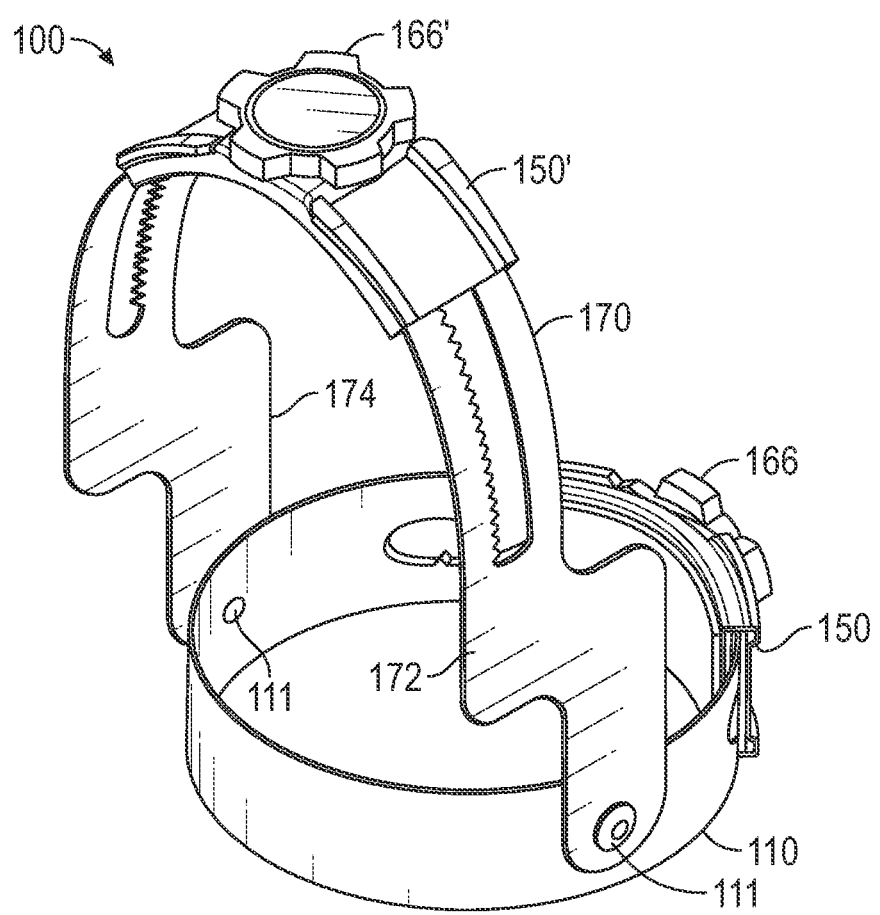
FIG. 9 is a perspective view of the waste system securing strap assembly shown in FIG. 1, without the waste elbow or the standpipe.

As seen in FIG. 9, pivot ends 176, 192 of right strap portion 172 and left strap portion 174, respectively, are connected to strap 110, while ratcheting ends 182, 196 of right strap portion 172 and left strap portion 174, respectively, are attached to a second ratchet mechanism 150', similar to ratchet mechanism 150 discussed above. As knob 166' is rotated, depending on the rotation of knob 166', pivoting strap 170 is either tightened or loosened with respect to elbow 50.

To install assembly 100, horizontal strap portion 110 is first slid over standpipe 60. Next, elbow 50 is inserted into standpipe 60. Pivoting strap 170 is lifted up and pivoted over elbow 50, toward connection 52. Ratchet mechanism 150 is tightened to secure horizontal strap 110 around standpipe 60. Then, ratchet mechanism 150' is tightened to force elbow 50 downward into standpipe 60 to securely fasten elbow 50 into standpipe 60.

To remove elbow 50 and assembly 100 from standpipe 60 after effluent is discharged into standpipe 60, ratchet mechanism 150' can be loosened and pivoting strap 170 can be pivoted away from elbow 50. Elbow 50 can be removed from standpipe 60 and ratcheting mechanism 150 is loosened from standpipe 60 so that assembly 100 can be lifted up standpipe 60 and removed.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A securing strap assembly comprising:
   a horizontal strap configured to wrap around a vertical standpipe; and
   a pivoting strap pivotally attached to the horizontal strap and configured to extend over a pipe elbow inserted into the vertical standpipe, the pivoting strap having:
      a first leg having a first connected end pivotally connected to the horizontal strap and a first adjusting end;
      a second leg having a second connected end pivotally connected to the horizontal strap and a second adjusting end; and
      a first adjustment mechanism configured to draw the first adjusting end and the second adjusting end to each other,
   wherein the horizontal strap comprises a first strap end, a second strap end, and a second adjustment mechanism configured to draw the first strap end and the second strap end to each other, an
   wherein the first strap end comprises a first partially toothed cutout having a first plurality of inwardly extending teeth formed along a top portion thereof and wherein the second strap end comprises a second partially toothed cutout having a second plurality of inwardly extending teeth formed along a bottom portion thereof.

2. The securing strap assembly according to claim 1, wherein the first adjusting end is connected to the first adjustment mechanism.

3. The securing strap according to claim 2, wherein the first leg further comprises a first dogleg extending from the first pivot end to the first adjusting end.

4. The securing strap according to claim 3, wherein the the second adjusting end is connected to the first adjustment mechanism and wherein the second leg further comprises a second dogleg extending from the second pivot end to the second adjusting end.

5. The securing strap assembly according to claim 4, wherein the first pivot end and the second pivot end are on opposing sides of the standpipe from each other.

6. The securing strap assembly according to claim 5, wherein the standpipe comprises a central axis extending therethrough and wherein, when the first connected end and the second connected end are on opposing sides of the standpipe from each other, the first and second doglegs locate the first adjustment mechanism away from the central axis.

7. A securing strap assembly comprising:
   a horizontal strap having a first horizontal strap end, a second horizontal strap end, and a first adjustment mechanism configured to move the first horizontal strap end relative to the second horizontal strap end; and
   a pivoting strap configured to extend over a pipe elbow inserted into the vertical standpipe, the pivoting strap having:
      a first leg having a first connected end pivotally connected to the horizontal strap, a first adjusting end, and a first dogleg extending between the first connected end and the first adjusting end;
      a second leg having a second connected end pivotally connected to the horizontal strap, a second adjusting end, and a second dogleg extending between the second connected end and the second adjusting end; and
      a second adjustment mechanism configured to draw the first adjusting end and the second adjusting end to each other.

8. The securing strap assembly according to claim 7, wherein the first adjusting end and the second adjusting end each include a partially toothed cutout, each cutout having a plurality of inwardly extending teeth and wherein the second adjustment mechanism comprises a toothed wheel engageable with the plurality of inwardly extending teeth.

9. The securing strap assembly according to claim 7, wherein the first horizontal strap end and the second horizontal strap end each include a partially toothed cutout, each cutout having a plurality of inwardly extending teeth and wherein the first adjustment mechanism comprises a toothed wheel engageable with the plurality of inwardly extending teeth.

10. The securing strap assembly according to claim 7, wherein the first dogleg extends at a ninety degree angle relative to each of the first connected end and the first adjusting end.

11. The securing strap assembly according to claim 7, wherein the horizontal strap is configured to wrap around a horizontal standpipe, wherein the standpipe comprises a central axis extending therethrough and wherein, when the first connected end and the second connected end are on opposing sides of the standpipe from each other, the first and second doglegs locate the first adjustment mechanism away from the central axis.

12. The securing strap assembly according to claim 11, wherein the first and second legs are proximate to the first adjustment mechanism and the first and second adjusting ends are distal from the first adjustment mechanism.

13. A method of securing a pipe elbow to a standpipe having a central axis, the method comprising the steps of:
  (a) sliding the horizontal strap of claim 7 over the standpipe;
  (b) inserting the pipe elbow into the standpipe;
  (c) lifting the pivoting strap up and pivoting the pivoting strap over the elbow, thereby moving the second adjustment mechanism toward the central axis;
  (d) tightening the first adjustment mechanism to secure the horizontal strap around the standpipe; and
  (e) tightening the second adjustment mechanism to force the elbow downward into the standpipe.

* * * * *